Oct. 27, 1959  H. F. ERDLEY ET AL  2,909,930
TEMPERATURE COMPENSATED FLOATATION GYROSCOPE
Filed Jan. 10, 1958  2 Sheets-Sheet 2

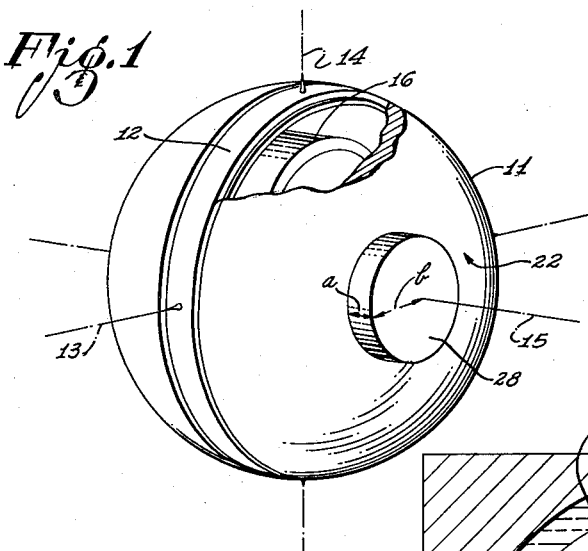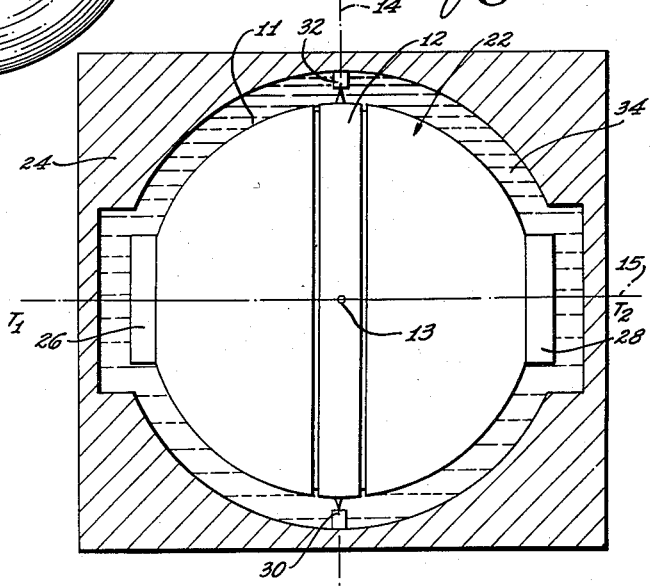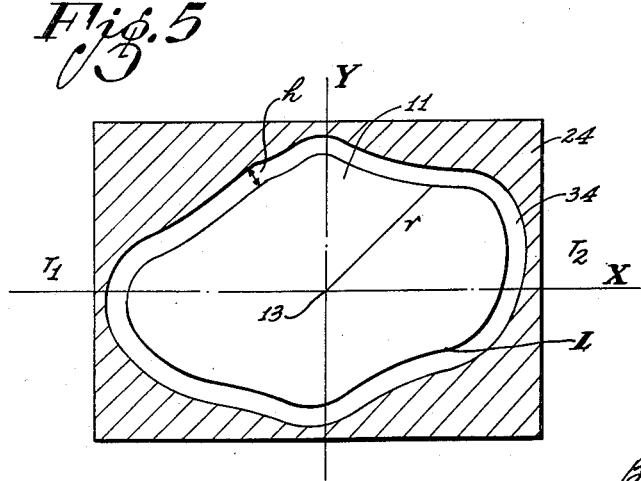

INVENTORS:
Harold F. Erdley
Joseph G. Acterman

By Robert H. Lentz
Attorneys

United States Patent Office 2,909,930
Patented Oct. 27, 1959

2,909,930

TEMPERATURE COMPENSATED FLOATATION GYROSCOPE

Harold F. Erdley, Los Angeles, and Joseph S. Acterman, Pacific Palisades, Calif., assignors to Litton Industries of California, Beverly Hills, Calif.

Application January 10, 1958, Serial No. 708,276

11 Claims. (Cl. 74—5.4)

This invention relates to temperature compensated floatation instruments and more particularly to temperature compensated floatation instruments wherein error torques on the instrument's floated element due to temperature induced convection currents are eliminated.

While the invention to be hereinafter disclosed is applicable to all pivotally mounted floated instruments, such as gyroscopes and accelerometers, for ease of description and understanding the invention will be described with reference to a compensated floatation gyroscope. It is to be specifically understood, however, that the invention is not to be so limited but is to include all forms of pivotally mounted instruments.

As is well known, a gyroscope is a disk or rotor mounted to spin rapidly about a spin axis and gimbaled to permit rotation about one or two axes perpendicular to each other and to the axis of spin, the spinning rotor offering considerable resistance to any torque which would tend to change the direction of the axis of spin. Accordingly, gyroscopes have long been found useful as a stabilizer element, as in autopilots, and more recently have been utilized to establish an inertial reference plane for use in navigational systems. From the lay point of view, practically all gyroscopes employed as control instruments are generally considered as precision devices. However, the relatively recent concept of employing gyroscopes as long time mechanical memories in inertial autonavigators and guidance systems for controlling sustained flight has brought forth a need for ultra-precision gyros whose sensitivity and accuracy must be several orders of magnitude greater than that of pre-existing gyros. In other words, the ultra-precision gyros should not have drift rates exceeding on the order of .05 of a degree per hour, while drift rates of ½ a degree per minute are acceptable in conventional gyros.

In order to meet this need for an ultra-precision gyro the prior art has developed techniques for eliminating gyro bearing torques which have been a primary source of errors. Among these techniques have been the use of extremely small bearing surfaces, and the technique of floating the gyro rotor-and-motor assembly in a fluid of approximately the same density as the assembly, thereby removing the static load of the rotor and motor assembly from the bearings.

It has been discovered, however, that even a precisely floated gyro will still experience error torques due to the fact that the temperature of the floatation fluid is not uniform throughout the chamber holding the fluid, these torques being generated by convection current phenomena and floatation fluid density inequalities which are in turn created by the temperature differentials. While these torques are of such a magnitude that they would be relatively insignificant in a conventional gyro, they are of sufficient magnitude to prevent the accurate functioning of an ultra-precision gyro.

It was first thought that these temperature produced error torques could be avoided by mounted the gyro away from heat generating equipment, such as electric motors and blowers that would cause the floatation fluid to be subject to temperature differentials. In practice, however, it has been found to be impractical to locate the gyro far enough away from heat generating equipment to eliminate floatation fluid temperature differentials. Accordingly, there has been a long standing and continuing need for means to eliminate the error torques generated by temperature differentials.

The present invention provides a temperature compensated floatation gyroscope which fills the above-defined void in the art by eliminating these temperature induced error torques. In accordance with the basic concept of the invention, these error torques are eliminated by selecting a configuration for the gyro floated element which compensates convection current error torques with density inequality error torques so that the net error torque on the gyro float due to temperature inequalities is substantially zero. More specifically, the configuration of the floated element is determined in such a manner that the direction and magnitude of the torque due to floatation inequalities is adjusted to be equal and opposite in direction to the torque due to the convection current, thereby producing an instrument which is substantially insensitive to temperature differentials within the floatation fluid.

In the preferred embodiment of the invention the floated element has the configuration of a sphere with a pair of cylindrical appendages of predetermined dimensions mounted on opposite sides thereof along the gyros spin axis. As will be disclosed in more detail hereinbelow, the relative dimensions of the sphere and its cylindrical appendages are selected so that the appendages provide a density inequality torque which is equal in magnitude but opposite in polarity to the convection current torque created by the flow of floatation fluid around the combined sphere and its appendages.

In another embodiment of the invention the configuration of the floated element takes the form of a cylinder with a pair of ellipsoidal or spherical segments of predetermined dimensions symmetrically coupled to opposite ends of the cylinder. In this embodiment of the invention the dimension of the cylinder and the segments of the sphere are again chosen so that the error torques due to the convection current are equal and opposite in magnitude to the error torque due to floatation inequalities resulting in a net error torque due to temperature differentials in the floatation fluid equal to zero.

It will be understood from the discussion set forth hereinbefore that still other float configurations may be mechanized in accordance with the teachings of the invention. Moreover, it will be understood that the invention may be practiced by utilizing either mathematical analysis or empirical methods, whichever is best suited to the case at hand.

It is therefore an object of the invention to provide a floated instrument having a configuration such that the net error torques exerted on the floated element due to temperature differentials within the floatation fluid are zero.

A further object of the present invention is to provide a floated gyro having a configuration such that the temperature induced error torques exerted on the floated element due to density inequalities in the floatation fluid are used to compensate for error torques exerted on the floatation element due to floatation fluid convection currents.

Still another object of the present invention is to provide a precision gyro including a floated element having the configuration of a sphere with a pair of cylindrical appendages of predetermined dimensions mounted on opposite sides of the sphere along the spin axis.

It is a still further object of the invention to provide a precision gyro including a floated element having the form of a cylinder with a pair of symmetrical segments of an ellipsoid coupled to opposite ends of the cylinder.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Figure 1 is an isometric view of the floated element employed in one embodiment of a temperature compensated gyroscope, in accordance with the invention.

Figure 2 is a side elevation view, partly in section, of a gyro employing the floated element of Figure 1.

Figure 5 is a sectional side elevation view of a lamina of a floated element of generalized configuration which is useful in understanding the basic principles of the invention.

Figure 3:
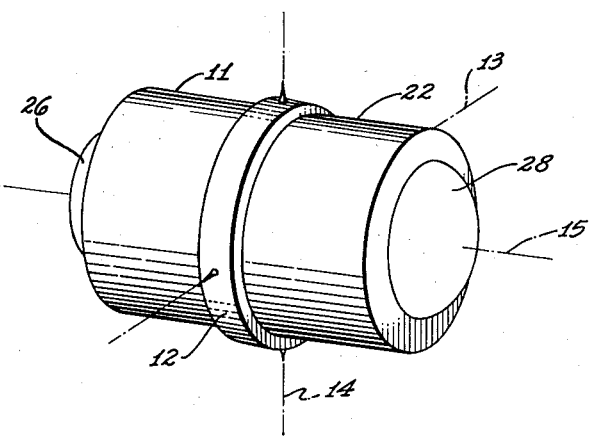
Figure 3 is an isometric view of a floated element of another embodiment of a temperature compensated gyroscope of the invention.

Referring now to the drawings, wherein like or corresponding parts are designated by the same reference characters throughout the several views, there is shown in Fig. 1 an isometric view of the floated components of a precision temperature compensated two-degree-of-freedom floatation gyroscope in accordance with the invention. As shown in Fig. 1, the floated components comprise an enclosed rotor-and-motor assembly 11, hereinafter termed the floated element, and a gimbal ring 12 which is coupled to the floated element by a pair of bearings defining an inner gimbal axis 13, a second pair of bearings being utilized to couple the gimbal ring to an associated gyro housing, not here shown, along an outer gimbal axis 14. As further shown in Fig. 1 the inner and outer gimbal axes are orthogonal with respect to each other and with respect to a spin axis 15 of a rotor 16 mounted within the floated element.

In accordance with the basic concept of the invention, floated element 11 comprises a central region 22 having a predetermined configuration, and a pair of integral end regions of a different configuration which are employed in conjunction with the central section to reduce to substantially zero the net effect on the floated element of temperature induced error torques. More specifically, the floated element of the particular embodiment of the invention shown in Fig. 1 comprises a substantially spherical central region along the spin axis 15, the end regions being utilized, as will be disclosed in more detail below, to generate a temperature induced error torque which counteracts the temperature induced error torques generated by the central region.

Before continuing with the description of the manner in which the configuration of floated element 11 functions to eliminate temperature induced error torques, consider first the manner in which the floated element and its associated gimbal ring 12 are physically mounted within the gyroscope. With reference now to Fig. 2, there is shown a side elevation view of floated element 11 as it is mounted within an associated housing 24, the two cylindrical end regions of the floated element being designated 26 and 28, respectively. As shown in Fig. 2, the floated element and gimbal ring are physically coupled to the gyro housing along the outer gimbal axis by a pair of jewel and pivot bearings 30 and 32, and are buoyed in substantially neutral suspension by a floatation fluid 34 which fills the region between the housing and the floated element.

It will be recognized by those skilled in the art that the selection of the floatation fluid is influenced by a number of factors which are basic to the gyro design. Firstly, it must be relatively dense, to permit floatation of the heaviest possible rotor-and-motor asseembly for any given volume, since the angular momentum of the gyro rotor, which is directly proportional to the mass of the rotor, should be as large as possible. Secondly, the floatation liquid should have the proper viscosity to permit optimum damping of the rotor-and-motor assembly. Still other factors which may influence the seelction of the floatation liquid are that it must be relatively inert so as not to react with any of the gyro materials exposed thereto, and it should have a coefficient of thermal expansion as compatible as possible with that of the gyro gimbal and the rotor-and-motor assembly so that the floatation of these elements is not adversely affected by temperature variations. Finally, the floatation liquid must be capable of transferring to the outer housing member of the gyro heat generated within the floated element. One of several known floatation liquids which at least partially satisfy the criteria imposed by the foregoing facts is sold under the trade name Flurolube FS, manufactured by the Hooker Electrochemical Co. of Niagara Falls, New York, this substance having a density of 1.86 grams per cubic centimeter and a viscosity of five centistokes at a temperature of 160 degrees Fahrenheit.

It should also be noted at this point that a practical embodiment of a temperature compensated precision gyroscope constructed according to the teachings herein set forth will include a plurality of pickoff coils intercoupling the floated element and housing for detecting rotational displacements of the floated element about the inner and outer gimbal axes, and may also include associated torquers for entering earth rate and other correction torques which may be required to maintain the gyro's attitude in a preselected coordinate system. In addition the gyro will include suitable electrical connectors intercoupling housing 24 and floated element 11 for energizing the gyro motor and for providing electrical connections to those portions of the associated pick-offs and torquers which are borne by the floated element. For purposes of simplicity and to facilitate an understanding of the present invention, however, these components have not been depicted in the drawings.

Consider now the manner in which the preselected configuration of floated element 11 functions to eliminate error torques induced by temperature differentials which may exist between opposite sides of the gyro housing. If it is assumed that the floatation fluid is at a temperature $T_1$ on the left side of the gyro as viewed in Fig. 1, and is at a temperature $T_2$, on the right side, and that temperature $T_1$ is higher than temperature $T_2$, then it is clear that a clockwise convection current will be set up in the floatation fluid, and that a clockwise error torque will be generated about inner gimbal axis 13 as a result of the viscous drag exerted on the surface of the floated element by the fluid.

In accordance with the present invention, the effect of the convection current error torque is nullified by compensating the torque with another error torque generated by density inequalities within the floatation fluid. More specifically, it will be recognized that the density of the floatation fluid will vary inversely with the temperature of the floatation fluid; accordingly, any area across which there is a temperature gradient produced by a temperature differential will experience a density gradient.

Assume now that a completely spherical floated element is used in the gyroscope. Since the pressure force of the floatation fluid acts normal to the surface of any object immersed therein, it will be recognized that all pressure forces acting on a sphere will pass through the center of buoyancy which lies at the common junction of the spin axis and the inner and outer gimbal axes. Hence there would be no error torque exerted by density inequalities in the floatation fluid, and there would be a net error torque imparted to the sphere by the aforementioned convection currents.

Consider now, however, the effect of constructing the floated element with cylindrical ends of length $a$ and radius $b$, as shown in Figs. 1 and 2. It should be noted first that the flat end surfaces of the two end sections develop a small clockwise torque which adds to the torque generated by the convection currents. The development of this torque on the flat end surfaces of the cylinders can be understood by remembering that the density of the floatation fluid at the flat surface of cylinder 26 is less than that at the end of cylinder 28 owing to the temperature differential between the left and right sides of the gyro. Consequently the force exerted against the flat surface of cylinder 28 is larger than that exerted against the flat end of region 26. Since it is clear from elementary fluid dynamics that the effective point of application of each of these forces is below the horizontal plane defined by spin axis 15 and inner gimbal axis 13 by virtue of the fact that pressure increases with depth, a clockwise torque is developed which adds to the error torques produced by convection currents around the floated element.

Notwithstanding the fact that the flat ends of the cylindrical sections will increase slightly the total clockwise error torque, it can be readily demonstrated that the curved or cylindrical surfaces of the two cylindrical end sections will generate a relatively large counter-clockwise torque which is a direct function of the temperature differential across the gyro and which may be utilized to precisely counteract the net effect of the above described clockwise error torques. The generation of this counter-clockwise torque can be verified qualitatively as follows. Inasmuch as the density of the fluid on the left hand side of the gyro is less than that on the right hand side owing to the temperature differential, and since the thermal coefficient of expansion of the floatation fluid is greater than that of the cylinders, it is apparent that the buoyant force acting on cylinder 28 will exceed that of cylinder 26. Moreover, the buoyant forces acting on each of the cylinders will act at points remote from the inner gimbal axis 13 so that a relatively small difference in the buoyant forces will generate a relatively large counter-clockwise torque.

It follows from the foregoing discussion that the difference in the buoyant forces, and hence the counter-clockwise torque, may be controlled by controlling the volume of the cylindrical end sections 26 and 28. It should be noted here that an increase in the length of the cylinders provides increased torque in a twofold manner, since the volume of the cylinders will be increased simultaneously with an increase in the distance between the center of mass of the floated element and the effective points of application of the buoyant forces on the cylindrical end regions. Conversely, an increase in the diameter of the cylindrical end regions will also increase the compensating error torque through an increase in volume, but will also increase slightly the torque produced by the flat ends of the cylinders, which it will be recalled is of the same polarity as the convection current torque.

It is important to note that if the outer gimbal axis is assumed to be oriented parallel to the local gravity vector, no convection currents will be induced to flow in the common plane of spin axis 15 and inner gimbal axis 13 owing to the fact that convection currents tend to flow in only vertical planes. If it is assumed, on the other hand, that the inner gimbal axis is aligned with the local vertical and that the spin axis and outer gimbal axis define the horizontal plane, it will be readily seen that cylindrical end regions 26 and 28 will continue to provide a compensating torque to overcome convection current error torques. In fact it will be recognized by those skilled in the art that the cylindrical end regions will compensate for convection current error torques regardless of the attitude of the inner and outer gimbal axes with respect to the local vertical so long as the axis of spin is perpendicular to the vertical.

In describing the present invention hereinabove it has been assumed that the floated element has a spherical central region and cylindrical end regions as shown in Figs. 1 and 2. It should be emphasized, however, that the basic invention herein disclosed is not restricted to any one particular configuration for the floated element, but encompasses the broad concept of employing a configuration for the floated element such that convection current error torques generated by a temperature differential across the gyro housing are counteracted by error torques generated by the floatation fluid density inequalities created by the same temperature differential.

Referring now to Fig. 3, there is shown an isometric view of another embodiment of floated element 11 and associated gimbal ring 12 of a temperature compensated gyroscope constructed in accordance with the invention. In this embodiment of the invention floated element 11 again has a configuration such that the convection current error torques are equal in magnitude and opposite in direction to error torques generated by the floatation fluid density inequalities. As shown in Fig. 3, the floated element comprises a central region 22 of substantially cylindrical configuration and a pair of end regions 26 and 28 having the configuration of spherical segments connected to two opposite ends of central region 22.

As shown in Fig. 3, floated element 11 is coupled to gimbal ring 12 by a pair of bearings defining an inner gimbal axis 13, a second pair of bearings being utilized to couple the gimbal ring to the associated gyro housing, not here shown. In addition, the spin axis 15 of the gyro rotor is orthogonal to the inner and outer gimbal axis and is parallel to the longitudinal axis of the central region while the center of curvature of the spherical segments of end regions 26 and 28 are located at the common junction of spin axis 15 and inner gimbal axis 13.

Figure 4:
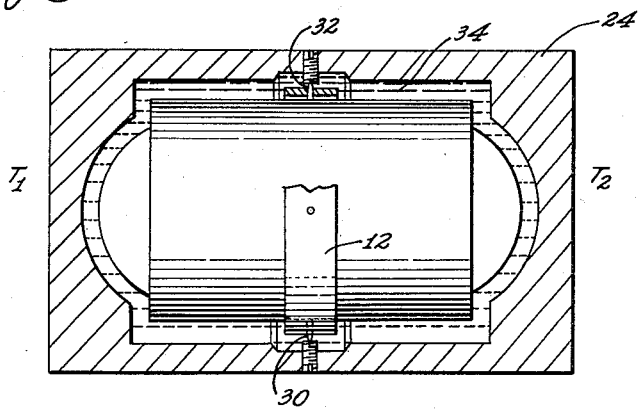
Figure 4 is a side elevation view, partly in section, of a gyro employing embodiment of the invention shown in Figure 3.

Considering the manner in which floated element 11 and its associated gimbal ring 12 are physically mounted within the gyroscope, reference is now made to Fig. 4 wherein there is shown a side elevation view, party in section, of floated element 11 as it is mounted within associated housing 24. As shown in Fig. 4, floated element 11 and gimbal ring 12 are physically coupled to the gyro housing along the outer gimbal axis by a pair of bearings 30 and 32, gimbal ring 12 being shown as broken to more fully expose the structure of the bearings. As in the embodiments of Figs. 1 and 2, the floated element and gimbal ring are buoyed in substantially neutral suspension by floatation fluid 34 which fills the region between housing 24 and floated element 11.

Consider now the manner in which the preselected configuration of floated element 11 functions to eliminate error torques about the inner gimbal axis induced by temperature differentials within the floatation fluid. If it is again assumed that the floatation fluid is at a temperature $T_1$ on the left side of the gyro housing and at a temperature $T_2$ on the right side of the gyro housing, as viewed in Fig. 4, and that temperature $T_1$ is greater than temperature $T_2$, then it is clear that a clockwise convection current will flow within floatation fluid 34. Therefore, a clockwise error torque will be exerted on floated element 11 as a result of the viscous frictional drag exerted on the surface of the floated element by the moving floatation fluid.

In accordance with the basic concept of the invention the effect of the convection current error torque is nullified by compensating the torque with other error torques generated by density inequalities within the floatation fluid. Considering first the direction and magnitude of the error torques developed over the curved surface of the central region of the floated element, it is clear after recalling the discussion of error-torques in connection with the first embodiment of the invention that the curved surface generates a relatively large counter-clockwise torque. The error torques developed over the flat end sections of a cylinder, it will be recalled, also contribute a smaller clockwise torque.

Consider now the effect of spherical end regions 26 and 28. Since it has been assumed that the center of curvature of the two spherical sections lies at the center of buoyancy, which in turn lies at the common junction of the spin axis and the inner and outer gimbal axes, no error torques will be developed over the surface of the end sections as a result of pressure differences caused by density inequalities. Therefore, the clockwise torque which would otherwise be developed over the flat end surfaces of central region 22 are reduced since only a flat ring end of each flat surface of central regions 22 remains to generate the clockwise error torque as a result of density inequalities. The magnitude of the net counter clockwise error torques produced over the whole surface of the floated element as a result of density inequalities is thereby increased and can be utilized to precisely counteract the clockwise convection current torque, thus providing a net error torque of substantially zero magnitude on the floated element.

It is important to note at this point that the center of curvature of the spherical end regions 26 and 28 need not lie at the center of buoyancy. In fact, by proper placement of the center of curvature on one side or the other of the inner gimbal axis either a clockwise or counter-clockwise torque can be generated. Thus, the counter-clockwise error torque developed over the curved surface of cylinder 22 may be balanced with the clockwise convection current error torque developed around the floated element and the torques contributed by the ends of the floated element.

In describing the present invention hereinabove the floated element has been described as an integral unit of one piece having a central region of one configuration and end region of another configuration. While the floated element of the invention can be easily mechanized by shaping an integral unit to take the form of the central and end regions, it should be herein noted that an equally satisfactory mechanization of the invention can be made by fabricating the central region and the two end regions of the floated element separately, and appending the end regions to the central region to produce the floated element. In addition, it should be herein noted that while empirical methods can be used to determine the exact dimensions of a gyro floated element in accordance with the invention, configurations of the floated element which are consistent with the teachings herein disclosed can also be determined by mathematical treatment as will be hereinafter fully discussed.

Referring once more to the drawings, there is shown in Fig. 5 a side view of a lamina of floated element 11 having a uniform cross-section and of uniform unit thickness and an associated housing 24. An X—Y coordinate system is further superimposed over the figure for purposes of easy reference to any part of the floated element.

As shown in Fig. 5, the floated element has a generalized cross-sectional configuration which is helpful in facilitating the understanding of the mathematical analysis of the invention. It will also be assumed that the inner gimbal axis and gimbal ring not here shown, are orthogonal to the plane of the coordinate system, the inner gimbal axis intersecting the plane of the coordinate system at the origin point of the coordinate system. The spin axis, on the other hand, is assumed coincident with the X axis of the coordinate system.

As shown in Fig. 5, floated element 11 has a circumference of length L and cross sectional area A, while the straight line distance from any point on the circumference of the floated element to the origin of the coordinate system is designated and defined as distance $r$. In addition, the floated element is situated in housing 24 such that the floated element is buoyed in substantially neutral suspension by floatation fluid 34, having a density $\rho$, which fills the region between the housing and the floated element, this region being assumed to have a constant cross-sectional depth $h$.

If the left side of housing 24, as shown in Fig. 5, is now subjected to a temperature $T_1$, and the right side of the housing is subjected to a temperature $T_2$, temperature differentials will be produced within floatation fluid 34. Now assumed that the density of the floatation fluid is a linear function of temperature, that the velocity of the floatation fluid convection currents is substantially constant around the circumference of the floated element, and that accelerating forces may be neglected, then it can be shown that the magnitude of the pressure created error torques generated about inner gimbal axis 13 as a result of density inequalities is given by the following equation:

$$\tau \text{ density} = \oint r^2 \rho dy - r_0^2 \oint \rho dy \qquad (1)$$

or rewriting equation (1) in terms of temperature $$\tau \text{ density} = \oint r^2 KT dy - r_0^2 \oint KT dy \qquad (1A)$$

where $r_0^2$ is defined by:

$$r_0^2 = \frac{1}{L} \oint r^2 ds \qquad (2)$$

and $ds$ is a differential unit of surface area of the lamina of floated element 11 and T is representative of temperature and K is a constant of proportionality, further it can be shown that the magnitude of the error torque developed as a result of the floatation fluid convection current is given by:

$$\tau \text{ convection} = \frac{2hA}{L} \oint \rho dy \qquad (3)$$

or in terms of temperature $$\tau \text{ convection} = \frac{2hA}{L} \oint KT dy \qquad (3A)$$

It follows from the foregoing discussion that it is possible to compute the magnitude of the error torques exerted on the lamina of floated element 11. Further, by considering floated element 11 to be composed of a number of lamina, each having a different incremental cross-section and by summing the torques due to each lamina by integration, the total error torques developed can be computed. Therefore, by setting the ratio of the density inequalities error torque to the convection current error torque equal to $-1$, in accordance with the basic teachings of the invention, since the density inequalities torque is counteracted by the convection current torque according to the invention, the exact dimensions of floated element 11 having any desired configuration can be computed.

It is to be expressly understood, of course, that numerous other modifications and alterations may be made in the compensated floatation instrument of the invention herein disclosed without departing from the basic concept of the invention. For example, the configuration of the floated element is not limited to a spherical central region with cylindrical end regions or a cylindrical central region and spherical end regions, but be a smooth integral form such as an ellipsoid, for example. Further, the invention includes a compensated single degree of freedom gyroscope as well as other pivotally mounted floatation instruments, such as an accelerometer. Accordingly, the scope of the invention is to be limited only by the spirit and scope of the appended claims.

What is claimed as new is:

1. A precision floatation gyroscope which is insensitive to error torques caused by temperature induced density inequalities in the floatation fluid and by temperature induced convection currents in the floatation fluid, said gyroscope comprising: a hollow housing member; an enclosed motor-and-rotor assembly positioned within said housing member and buoyed in substantially neutral suspension by the floatation fluid, said assembly including a rotatable element having an axis of spin; and means for coupling said assembly to said housing member to permit rotation of said assembly relative to said housing about at least one gimbal axis perpendicular to said spin axis, said enclosed rotor-and-motor assembly including a central region having a first configuration upon which forces created by temperature differentials in the floatation fluid generate a first error torque about said gimbal axis, and first and second end regions of predetermined configuration integrally connected to said central region and operative in response to temperature differentials in the fluid to generate a second error torque about said gimbal axis substantially equal in magnitude and opposite in polarity to said first torque.

2. The gyroscope defined in claim 1 wherein said central region is substantially spherical in configuration whereby temperature differentials in the floatation fluid between opposite ends of the housing member along the spin axis create a convection current torque about said gimbal axis, and wherein said first and second end regions are substantially cylindrical in configuration for producing a combined density inequality and convection torque which counteracts the torque generated by said central region.

3. The gyroscope defined in claim 2 wherein said central region and first and second regions are symmetrical with respect to said spin axis.

4. In a precision two-degree of freedom gyroscope, the combination comprising: a housing member; an enclosed rotor-and-motor assembly positioned within said housing member, said assembly having a spin axis and a center of mass; a gimbal ring positioned within said housing member around said rotor-and-motor assembly; a first pair of bearings for rotatably mounting said assembly to said gimbal, said first pair of bearings defining an inner gimbal axis orthogonal with respect to said spin axis; a second pair of bearings for rotatably mounting said gimbal ring to said housing member, said second pair of bearings defining an outer gimbal axis orthogonal with respect to said spin axis and said inner gimbal axis; and a floatation fluid surrounding and buoying said assembly and gimbal ring in substantially neutral suspension, said enclosed rotor-and-motor assembly including a central region having a first predetermined configuration, and first and second end regions disposed on opposite sides of said central region along said spin axis, said end regions having a second predetermined configuration and being responsive to temperature differentials across said housing member along said spin axis for generating an error torque about said center of mass which is substantially equal in magnitude and opposite in polarity to the error torque about said center of mass generated by said central region in response to said temperature differential.

5. The combination defined in claim 4 wherein said central region of said assembly is substantially spherical, and said first and second end regions have a cylindrical configuration, the axes of said end regions coinciding substantially with said spin axis.

6. The combination defined in claim 4 wherein said central region of said assembly is substantially cylindrical, and said first and second end regions have the configuration of a segment of a sphere.

7. In a precision two-degree-of-freedom gyroscope wherein an encased rotor-and-motor assembly having a spin axis is neutrally suspended within a housing member by a floatation fluid and is gimbaled to the housing member to permit rotation of the assembly with respect to the housing member about two gimbal axes orthogonal with respect to each other and with respect to the spin axis, a hollow case for enclosing the gyroscope rotor-and-motor, said case comprising a central region and first and second end regions integral with said central region and disposed at opposite ends thereof along said spin axes, the configuration of said end regions being related to the configuration of said central region such that error torques induced by the action of floatation fluid density inequalities on the central region are balanced out by error torques induced by the action of floatation fluid density inequalities on said first and second end regions.

8. A precision gyroscope wherein floatation fluid convection current error torques are compensated for by error torques generated by variations in buoyancy with variations in fluid density, said gyroscope comprising: a housing member; a substantially spherical rotor-and-motor-assembly positioned within said housing member, said assembly having a spin axis and being rotatably coupled to said housing member along a pair of gimbal axes orthogonal with respect to each other and to said spin axis; a pair of cylindrical appendages affixed to said assembly at opposite sides thereof along said spin axis; and a floatation fluid filling the interior of said housing member for buoying the combination of said assembly and said appendages in substantially neutral suspension, said appendages being responsive to a temperature gradient in the floatation fluid in the direction of said spin axis for generating an error torque for counter-balancing the convection current error torques induced by the temperature gradient and acting on said assembly.

9. In a precision two-degree of freedom gyroscope, the combination comprising: a housing member; an enclosed rotor-and-motor assembly positioned within said housing member, said assembly having a spin axis and a center of mass; a gimbal ring positioned within said housing member around said rotor-and-motor assembly; a first pair of bearings for rotatably mounting said assembly to said gimbal, said first pair of bearings defining an inner gimbal axis orthogonal with respect to said spin axis; a second pair of bearings for rotatably mounting said gimbal ring to said housing member, said second pair of bearings defining an outer gimbal axis orthogonal with respect to said spin axis and said inner gimbal axis; and a floatation fluid surrounding said assembly and gimbal ring for buoying said assembly and gimbal ring in substantially neutral suspension, said enclosed rotor-and-motor assembly having a configuration such that density inequalities in the floatation fluid produced by a temperature gradient in the direction of said spin axis create a torque due to buoyancy imbalance on the assembly which compensates for the torque generated by convection currents induced in the floatation fluid by the temperature gradient.

10. In a precision instrument which is neutrally suspended within a housing member by a floatation fluid and is pivotally mounted within the housing member to permit rotation of the assembly with respect to the housing member about a pivot axis, a hollow case for enclosing the instrument, said case comprising: a central region; and first and second end regions integral with said central region and disposed at opposite ends thereof along a line orthogonal to said pivot axis, the configuration of said end regions being related to the configuration of said central region such that error torques induced by the action of the floatation fluid density inequalities on the central region are balanced out by error torques induced by the action of floatation fluid density inequalities on said first and second end regions.

11. In a precision instrument, the combination comprising: a housing member; an enclosed instrument assembly positioned within said housing member and free to rotate about a pivot axis; bearing means positioned within said housing member pivotally mounting said instrument assembly to said housing member; and a fluid surrounding said assembly and bearing means for buoying said assembly and bearing means in substantially neutral suspension, said enclosed assembly including a central region having a first predetermined configuration, and first and second end regions disposed on opposite sides of said central region along a line orthogonal to said pivot axis, said end regions having a second predetermined configuration and being responsive to temperature differentials across said housing member along a line orthogonal to said pivot axis for generating an error torque which is susbtantially equal in magnitude and opposite in polarity to an error torque about said central region in response to said temperature differentials.

References Cited in the file of this patent

UNITED STATES PATENTS

| | | |
|---|---|---|
| 2,618,159 | Johnson et al. | Nov. 18, 1952 |
| 2,650,502 | Lundberg et al. | Sept. 1, 1953 |
| 2,826,918 | Hildebrand | Mar. 18, 1958 |